UNITED STATES PATENT OFFICE.

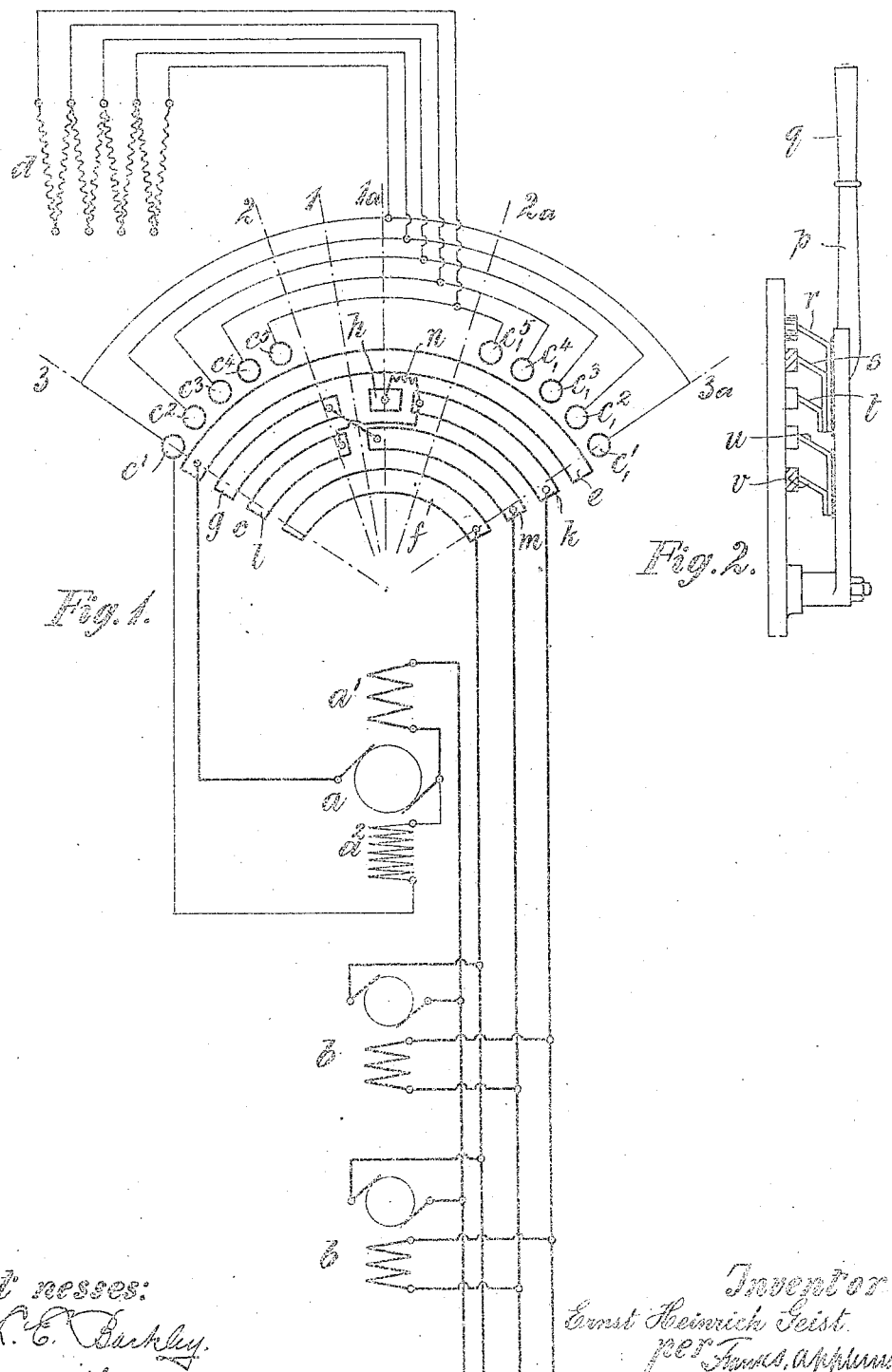

ERNST HEINRICH GEIST, OF COLOGNE, GERMANY.

CONTROLLING DEVICE FOR ELECTRIC MOTORS.

934,301.

Specification of Letters Patent. Patented Sept. 14, 1909.

Application filed November 16, 1908. Serial No. 462,837.

*To all whom it may concern:*

Be it known that I, ERNST HEINRICH GEIST, a subject of the King of Prussia, German Emperor, residing at Cologne-on-the-Rhine, in the Province of the Rhine, Kingdom of Prussia, German Empire, have invented certain new and useful Controlling Devices for Electric Motors, of which the following is a specification.

This invention relates to apparatus for the control of electric motors especially such as are used in hoists and cranes, although the apparatus is also applicable to the motors employed in tramways and railways, or indeed in any situation where comparatively sudden changes of output are necessitated.

The object of the invention is to allow the starting of the motor in either direction, or its stopping, or of a rapid change of speed without shock.

If a crane motor is supplied from the central station in the ordinary manner, very great losses of energy occur whenever the crane is started, because naturally a much larger current is required for starting than for normal running, while the voltage required to propel that current through the stationary or almost stationary armature of the motor, is comparatively small. As a result of this a very large part of the excessive energy supplied which is required on starting has to be wasted on resistances. Various attempts have been made to avoid this disadvantage by the use of auxiliary dynamos, fly wheels and accumulators. It is also the object of the present invention to provide a simple and effective means by which the said disadvantage may be avoided.

According to the invention, the generator from which current is supplied to the motor or motors to be regulated has a double field winding, one winding being in series with the armature and the other in shunt. This latter field alone can be regulated.

Prior to starting the motor the generator is on open circuit and therefore is unexcited. To start the motor this latter is connected to the generator which then immediately begins to excite itself while sending a current through the motor armature. By a diminution of the resistance in the circuit of the shunt winding, the field of the generator can be strengthened and so its voltage and output increased until the motor or motors begin, without any shock, to rotate. The speed can then be further regulated by the same means.

The invention is illustrated in the accompanying drawings in which—

Figure 1 shows diagrammatically a generator connected to the contacts of a switching device to which also the motors to be regulated are joined. Fig. 2 shows in side elevation a switch arm which is adapted to move over the contacts shown in Fig. 1 so as to vary the connections in the desired manner.

In Fig. 1, $a$ is the generator which may be driven by any suitable prime motor, e. g., an internal combustion motor or an electric motor. This generator $a$ has a field winding $a'$ in series with its armature, and a shunt winding $a^2$ joined to one of its brushes and to one of the end contacts $c'$ of the switching arrangement $c$. In the switch there are a number of contacts $c', c^2, c^3 \ldots$, $c_1^1, c_1^2, c_1^3, \ldots$, which are joined in pairs as $c^1 c_1^1, c^2 c_1^2, c^3 c_1^3$. The connecting leads are also joined to the parts of a resistance $d$ of any suitable type. The contacts $c^1 \cdot c_1^1$ are arranged in a circular arc as shown with a space in the middle. Concentric with them are metal circular segments $e$ and $f$, and between these segments are arranged other segments of which the outer is divided into three portions $g$, $h$, $k$, and the inner into two portions $l$, $m$. The segment $g$ is connected directly with the segment $m$ and the segment $l$ with the segment $k$. The segments $h$ and $k$ are joined through a resistance $n$. The motors $b$ have each one terminal connected as shown to a terminal of the generator $a$, and their other terminals to a conductor joined to the segment $f$. The remaining terminal of the armature of the machine $a$ is joined to the segment $e$, and the fields of the motors $b$ are connected across conductors joined respectively to the segments $m$ and $k$.

From Fig. 2 it will be seen that the switch arm $p$, which is provided with a handle $q$ by which it may be operated, has two sets of contacts. The outer set comprises three brushes $r$, $s$, $t$, connected together and adapted to bear respectively on the ring of contacts $c^1$, $c_1^1$ etc. on the segment $e$ and on the segments $g$, $h$, $k$. The second set of contacts comprises two brushes $u$, $v$, connected together and adapted to bear respectively on the segments $l$, $m$ and $f$.

When the switch arm $p$ is in the position indicated by the line 1 the motors $b$ are not connected to the generator $a$. If the switch arm is moved to the position $1^a$ the motor fields are immediately connected in series with their armatures and are joined to the terminals of the generator $a$, the resistance $n$ however, being interposed in the circuit. If the switch arm is moved farther to the right to the position $2^a$, the resistance $n$ is cut out of circuit. Further movement of the switch arm brings the brush $r$ on to the contact $c_1^5$ when the circuit of the shunt winding $a^2$ of the generator $a$ is completed through the whole of the resistance $d$. As the switch arm successively moves over the contacts $c_1^5$, $c_1^4$, $c_1^3$ etc. the parts of this resistance $d$ are cut out until in the position $3^a$ the winding $a^2$ is simply in shunt with the armature of the machine $a$. Movement of the switch arm $p$ in the opposite direction brings about a similar series of events. In the position 2 the motors $b$ are joined to the generator $a$ but in this case there is no resistance $n$ interposed. Moreover owing to the connections of the segments $g$, $m$, $l$, $k$, the current now traverses the fields of the machines $b$ in the opposite direction to that taken before, so that the motors will begin to run in the opposite direction. Further movement of the switch arm $p$ to the left completes the shunt circuit $a^2$ through the resistance $d$, and then gradually removes the resistance from the circuit until in the position 3 the shunt winding is again directly connected to the brushes of the machine.

It will be seen that this apparatus provides for the method of regulation first set out above, namely, when the motor to be regulated is to be started, it is first joined to the terminals of the generator. Current then begins to flow and the generator to excite itself by means of its series coil. When the shunt circuit is completed the field is further increased and as resistance is cut out the current through the motor attains such a value that it begins to rotate, but without any sudden start. After this speed variation may be effected simply by varying the amount of the resistance $d$ in the field circuit $a^2$.

What I claim is:—

Apparatus for regulating an electric motor, comprising an electrical generator, a field winding on said generator in series with its armature, a motor to be regulated, an armature winding on said motor permanently in series with the generator armature, in combination with a shunt field winding on said generator wound to assist the first, resistances, a switching device, and connections between the generator and motor windings, the resistances and said switching device, whereby the field and armature circuits of the generator may be closed through the switch and the resistances inserted into and removed from the circuit of the second field winding.

In testimony whereof I have signed my name to this specification in the presence of two subscribing witnesses.

ERNST HEINRICH GEIST.

Witnesses:
  LOUIS VANDORN,
  H. STETZER.